June 2, 1931.  A. M. SWANSON  1,807,713
HALVING AND PITTING DEVICE
Filed Feb. 15, 1929
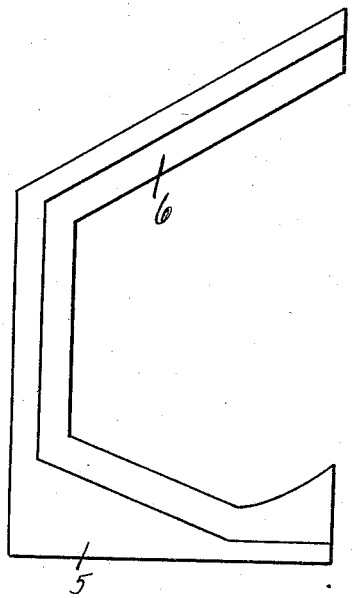
Fig. I.
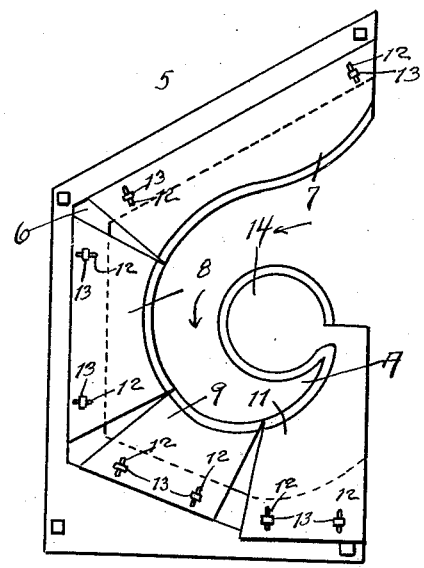
Fig. II.
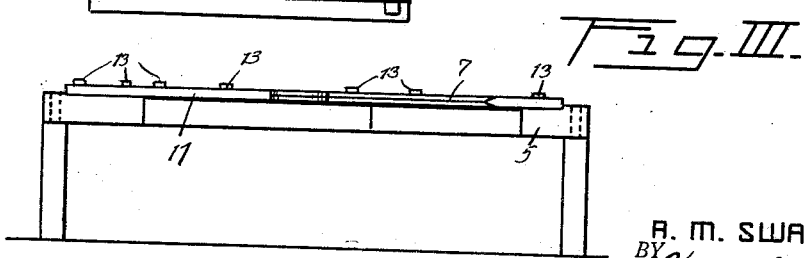
Fig. III.
INVENTOR.
A. M. SWANSON
BY Victor J. Evans
ATTORNEY Patented June 2, 1931

1,807,713

UNITED STATES PATENT OFFICE

ALBERT M. SWANSON, OF COLTON, CALIFORNIA

HALVING AND PITTING DEVICE

Application filed February 15, 1929. Serial No. 340,128.

This invention relates to improvements in halving and pitting devices.

The principal object of this invention is to provide means whereby fruit may be cut in half and the pit removed therefrom in an expeditious manner.

A further object is to produce a device which is economical to manufacture, one wherein the blades may be readily adjusted to accommodate for various sizes of fruit, one where the blades may be readily removed for the purpose of sharpening.

A still further object is to produce a device which is portable.

Other objects and advantages will be apparent during the course of the following description.

In the accompanying drawings forming a part of this specification and in which like numerals are employed to designate like parts throughout the same, Figure 1 is a top plan view of the blade carrier block, Figure 2 is a top plan view of Figure 3, and Figure 3 is a front elevation of my device as the same would appear when ready for use.

In the processing of many fruits such as apricots, peaches, prunes and the like fruit it is necessary to cut the fruit in half so that it may be readily dried and thus preserved for future use. It has been accustomed to do this cutting and pitting operation by hand which was a tedious occupation as well as a dangerous one due to the fact that the knife often slipped and cut the operator.

Applicant has therefore devised a very simple cutting and pitting tool which consists essentially of a small stand which may be placed upon a table or other suitable support in either a horizontal or vertical position, which stand carries a plurality of knives of peculiar construction adjustably secured to the stand against which knives the fruit is moved, halved and pitted.

In the accompanying drawings wherein for the purpose of illustration is shown a preferred embodiment of my invention, the numeral 5 designates the blade carrier block which may be made of any material suitable for the purpose. This carrier block has a recess 6 extending around its inner edge, the purpose of the recess being to position the knives 7, 8, 9 and 11. These knives are each slotted as shown at 12 so that a bolt 13 passing therethrough permits the knives to be moved toward or away from a central point.

It will be noted that by viewing Figure 2 that the contour of the knife 7 is such as to lead the fruit to be halved inwardly and downwardly so as to contact the blade 8 which blade further leads the fruit into engagement with the blade 9 and finally into engagement with the blade 11. The circular portion 14 of the blade 11 causes the fruit to be held against the knives 7, 8, 9 and 11 at the same time the circular portion is also acting as a cutter and consequently by the time the fruit has reached the end of its travel the meat has been entirely cut about the pit and the pit will become wedged at the point A the two halves will fall away from the pit and the stone or pit may be dislodged if it does not fall away of its own accord. It is therefore only a matter of the operator picking up fruit and passing it into the slot in the direction of the arrows indicated in Figure 2. This simplifies the operation so that a very rapid halving of the fruit can be accomplished, a much cleaner job done and at the same time the risk of cutting the operator's hand is practically eliminated.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a blade carrier angular block, means for supporting said block, a plurality of blades secured in spaced relation to the inner portion of said block, means for adjusting said blades to and from a central point, the edge of each of said blades converging into the next of said adjacent blades.

2. In a device of the character described, a blade carrier angular block, means for supporting said block, a plurality of blades secured in spaced relation to the inner portion of said block, means for adjusting said blades to and from a central point, the edge of each of said blades converging into the next of said adjacent blades, the converging edges of said blades forming an arcuate cutting edge and a circular knife portion adapted to force the fruit being cut into engagement with the arcuate blades as described.

3. In a device of the character described, a blade carrier block, means for supporting said block, a plurality of blades secured to said block, one of said blades having a substantial circular portion, means for adjusting the other of said blades toward and away from said circular portion, the edges of each of said blades converging into the next of said adjacent blades, the converging edges of said blades forming an arcuate edge, said circular portion being adapted to force the fruit being cut into engagement with the arcuate blades in the manner described.

In testimony whereof I affix my signature.

ALBERT M. SWANSON.